(12) United States Patent
Kerekes et al.

(10) Patent No.: US 6,357,855 B1
(45) Date of Patent: Mar. 19, 2002

(54) NON-LINEAR PRINTHEAD ASSEMBLY

(75) Inventors: Thomas A. Kerekes, Calabasas; Bryan J. L. Bedal, Santa Clarita; Joe M. Brown, Valencia, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/260,522

(22) Filed: Feb. 25, 1999

Related U.S. Application Data

(63) Continuation of application No. 08/722,335, filed on Sep. 27, 1996.

(51) Int. Cl.[7] .............................. B41J 2/145; B28B 1/00; B28B 1/30
(52) U.S. Cl. ......................... 347/40; 264/113; 264/129
(58) Field of Search ................... 347/20, 40; 264/109, 264/129, 130, 131, 132, 133, 134, 112, 113; 425/375

(56) References Cited

U.S. PATENT DOCUMENTS

| | | | | |
|---|---|---|---|---|
| 5,204,055 A | * | 4/1993 | Sachs et al. ................ 264/23 |
| 5,260,009 A | * | 11/1993 | Penn ........................ 264/40.1 |
| 5,270,728 A | * | 12/1993 | Lund et al. ................ 400/121 |
| 5,340,090 A | * | 8/1994 | Orme et al. ................ 266/202 |
| 5,387,380 A | * | 2/1995 | Cima et al. ................. 264/69 |
| 5,555,176 A | * | 9/1996 | Menhennett et al. .. 364/468.25 |
| 5,880,756 A | * | 3/1999 | Ishii et al. .................. 347/40 |
| 5,943,235 A | * | 8/1999 | Earl et al. ............. 364/468.04 |
| 6,007,318 A | * | 12/1999 | Russell et al. ............. 425/130 |
| 6,165,406 A | * | 12/2000 | Jang et al. .................. 364/308 |
| 2001/0003004 A1 | * | 7/2001 | Leyden et al. ............. 425/375 |

OTHER PUBLICATIONS

Lane et al., "Correction of Aerodynamic Drag in Ink Jet Streams," Mar. 1976, IBM Technical Disclosure Bulletin, vol. 18, No. 10, pp. 3474–3475.*

* cited by examiner

*Primary Examiner*—Daniel J. Colilla

(57) ABSTRACT

This invention relates to the formation of three-dimensional objects on substantially layer-by-layer basis with enhanced resolution. The invention utilizes a unique offset printhead containing groups of jets to selectively deposit a hot-melt material.

9 Claims, 3 Drawing Sheets

NON-LINEAR PRINTHEAD ASSEMBLY

This application is continuation of application Ser. No. 08/722,335, filed Sep. 27, 1996.

FIELD OF THE INVENTION

This invention relates to the formation of three-dimensional objects on substantially layer-by-layer basis with enhanced resolution. The invention utilizes a unique offset printhead containing groups of jets to selectively deposit a hot-melt material.

BACKGROUND OF THE INVENTION

Rapid prototyping and modeling (RP&M) is the name given to a field of technologies that may be utilized to form three-dimensional objects rapidly and automatically from three-dimensional computer data representing the objects. In particular the present invention pertains to selective deposition modeling (SDM).

The essence of selective deposition modeling in the present invention is through the use of ink jets and in particular from an offset ink-jet head. In particular, a selective deposition modeling machine typically operates through the movement of a printhead in a X-direction that sprays a hot-melt material from the ink jets onto a building surface. The building surface is upon a building platform. The building platform moves in the Y-direction. The building platform also moves in the Z-direction. For practical purposes in the discussion of this invention the movement in the Z-direction is not particularly consequential.

The stereolithography class of technologies create three-dimensional objects based on the successive formation of layers of a fluid-like medium adjacent to previously formed layers of medium and the selective solidification of those layers according to cross-sectional data representing successive slices of the three-dimensional object in order to form and adhere laminae. Another technique is called Multijet Modeling, MJM, and involves the selective deposition of droplets of material from multiple ink jet orifices to speed the building process. MJM is described in PCT Publication Nos. WO 97-11835 published Apr. 3, 1997 naming Leyden as an inventor and WO 97-11837 published Apr. 3, 1997 naming Earl as an inventor (both assigned to 3D Systems, Inc. as is the instant application).

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. An example FDM process is described in U.S. Pat. No. 5,121,329 issued Jun. 9, 1992 to Crump. Another technique is called ballistic particle manufacturing which uses a 5-axis, ink-jet dispenser to direct particles of a material onto previously solidified layers of the object. Example ballistic particle manufacturing processes are described in PCT publication numbers WO 96-12607 published May 2, 1996 listing Brown as an inventor; WO 96-12608 published May 2, 1996 listing Brown as an inventor; WO 96-12609 published May 2, 1996 listing Menhennett as an inventor; and WO 96-12610 published May 2, 1996 listing Menhennett as an inventor.

SUMMARY OF THE INVENTION

The present invention describes a printhead assembly for a three-dimensional printer comprising a non-linear printhead having a width and a length, said non-linear printhead length having a lengthwise axis, a dispensing carriage having a width and a length, said dispensing carriage length having a lengthwise axis, said non-linear printhead connected with said dispensing carriage and provided further that the lengthwise axis of said non-linear printhead and the lengthwise axis of said dispensing carriage, would if in the same plane, intersect.

A further feature of the present invention is a printhead assembly for a three-dimensional printer comprising a non-linear printhead having a width and a length, said non-linear printhead length having a lengthwise axis, a dispensing carriage having a width and a length, said dispensing carriage length having a lengthwise axis, said non-linear printhead connected with said dispensing carriage and provided further that the lengthwise axis of said non-linear printhead and the lengthwise axis of said dispensing carriage are not parallel and are not coincidental.

Yet a firther embodiment of the present invention is a method for three-dimensional printing to obtain a three-dimensional object including utilizing a printhead assembly comprising a non-linear printhead having a width and a length, said non-linear printhead length having a lengthwise axis, a dispensing carriage having a width and a length, said dispensing carriage length having a lengthwise axis, said non-linear printhead connected with said dispensing carriage and provided further that the lengthwise axis of said non-linear printhead and the lengthwise axis of said dispensing carriage, would if in the same plane, intersect and jetting a material from the printhead on successive occasions to obtain a three-dimensional object.

Yet a further aspect of the present invention is a method of three-dimensional printing to obtain a three-dimensional object including utilizing a printhead assembly comprising a non-linear printhead having a width and a length, said non-linear printhead length having a lengthwise axis, a dispensing carriage having a width and a length, said dispensing carriage length having a lengthwise axis, said non-linear printhead connected with said dispensing carriage and provided further that the lengthwise axis of said non-linear printhead and the lengthwise axis of said dispensing carriage are not parallel and are not coincidental, and jetting a material from the printhead on successive occasions to obtain a three-dimensional object.

Yet a further embodiment of the present invention is a three-dimensional printing apparatus employing an offset printhead and a moveable printing platform wherein the offset printhead, when in operation, moves in the direction of the X-axis (Y-Z plane) and the moveable printing platform moves, when in operation, in the direction of the Y-axis (X-Z plane), wherein the printhead, when printing, deploys a greater number of droplets per inch in the in the direction of the X-axis and a lesser number of droplets per inch in the in the direction of the Y-axis.

Yet a further aspect of the present invention is a method of three-dimensional printing employing an offset printhead and a moveable printing platform wherein the offset printhead, when in operation, moves in the direction of the X-axis (Y-Z plane) and the moveable printing platform moves, when in operation, in the direction of the Y-axis (X-Z plane), wherein the printhead, when printing, deploys a greater number of droplets per inch in the in the direction of the X-axis and a lesser number of droplets per inch in the in the direction of the Y-axis.

DETAILED DESCRIPTION OF THE INVENTION

As previously discussed, the subject application is directed to control system techniques for controlling jobs in a Selective Deposition Modeling (SDM) system. The detailed description of a preferred embodiment of the invention will begin with a description of a preferred Selective Deposition Modeling system wherein embodiment details will be described as appropriate.

Figure 1:
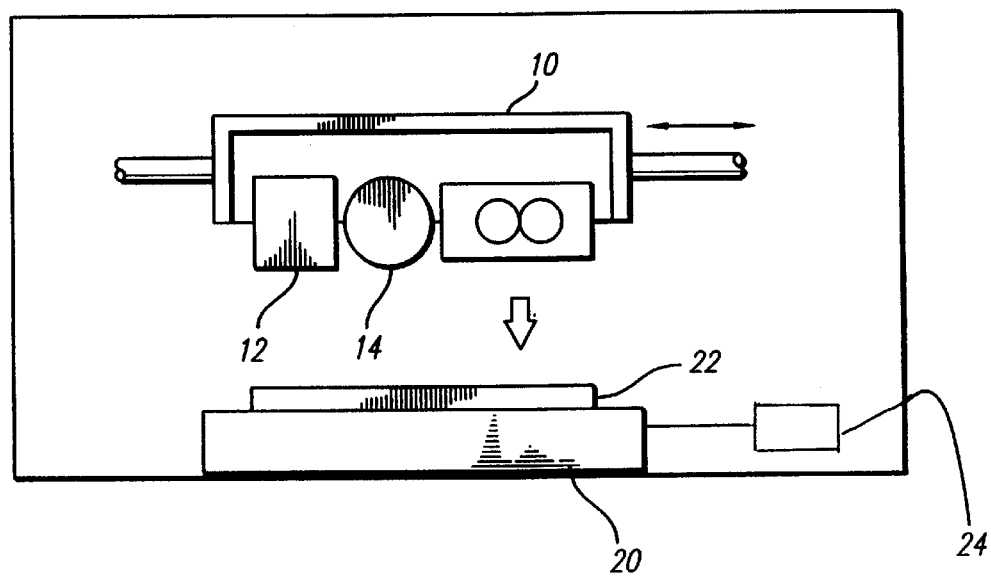
FIG. 1 shows a three dimensional printing apparatus comprising a dispensing carriage with an offset printhead, and a heated rotating cylinder with a smooth surface.

A preferred apparatus for performing Selective Deposition Modeling is illustrated in FIG. 1. The apparatus comprises a dispensing carriage 10 on which is situated dispensing head 12 (e.g. multi-orifice ink jet head) and planarizer (e.g., a rotating and/or heated roller) 14. The dispensing carriage 10 is supported and driveable back and forth in the X-direction, also known as the main scanning direction, adjacent a build platform 20. The spacing between the head 12 and the dispensing carriage 10 in FIG. 1 is exaggerated for simplifying the present disclosure. In practice the spacing would be small enough to allow the planarizer 14 to contact material deposited on the build platform by the head 12. The motion of the dispensing carriage 10 is under the control of a suitable drive motor and a control computer or microprocessor (not shown).

The dispensing head (also referred to as a printhead or dispenser) 12 may be for example, a commercial printhead configured for jetting color hot melt inks (e.g. thermal plastics or wax-like materials), and modified and/or controlled for use in a three-dimensional modeling system wherein the printhead 12 undergoes back and forth movements and accelerations. In one example preferred embodiment, the head is a 352 jet, multi-color commercial printhead produced by Tektronix, Inc. One group of jets comprises four jets, which in a color printhead, would represent four colors. Three jets are on the same X-line, and one jet at the end of the sequence of four jets is positioned slightly off of this X-line (i.e., on a different Y-dimension location from the other three jets).

The printhead 12 is supplied hot melt material in a flowable state from a reservoir (not shown) for selective jetting from the printhead. In a preferred implementation, all 352 jets on the printhead 12 are computer controlled to selectively fire droplets when each orifice 16 (i.e., jet) is appropriately located to dispense droplets onto desired locations of a build platform 20. In practice, commands are sent to each jet selectively commanding each one to fire (i.e., dispense a droplet) or not to fire (i.e., not to dispense a droplet) depending on jet position and desired locations for material deposition. Also, in practice, firing commands are preferably sent simultaneously to all jets. Thus, in a preferred embodiment, the head is computer controlled so as to selectively fire the jets, to simultaneously emit droplets of the molten material through one or more jets. Of course it will be appreciated that in alternative embodiments, heads with a different numbers of jets can be used, different firing frequencies are possible and, in appropriate circumstances, non-simultaneous firing of the jets is possible.

The printhead 12 defines a pattern of orifices corresponding in number to the number of jets. With respect to FIG. 1, the orifices are directed such that droplets of material are allowed to emit from the underside of the dispensing carriage 10. In a preferred embodiment, the dispensing head 12 (i.e., the array of orifices) is mounted at an angle to the main scanning direction (e.g. X-direction) and is configured with the N=352 individually controllable orifices, arranged in 88 groups of four jets.

Each dispenser (e.g., jet) is equipped with a piezoelectric element which causes a pressure wave to propagate through the material when an electric firing pulse is applied to the element in accordance with well known ink jet head technology. The pressure wave causes a drop of material to be emitted from orifice. The 352 dispensers are controlled by the control computer which controls the rate and timing of the firing pulses applied to the individual dispenser and therefore the rate and timing of droplets being emitted from the orifices.

One preferred embodiment uses raster scanning to position the printhead and orifices to dispense material at desired drop locations. The printing process for each layer is accomplished by a series of relative movements between the head and the desired drop locations on the build platform or previously formed layer. Printing typically occurs as the head relatively moves in a main scanning direction. This is followed by a movement of the build platform 20 in a secondary scanning direction (i.e., Y-direction), while the dispensing carriage 10 is moving in a reverse scanning direction (i.e., opposite X-direction from the direction of movement while dispensing) while no dispensing occurs. This is followed by another scan in the main scanning direction in which dispensing again occurs. Alternatively, dispensing may occur in both the forward and reverse X-direction. This process occurs repeatedly until the layer is completely deposited. The procedure is then repeated for each subsequent layer.

Other alternative embodiments may utilize vector scanning techniques or a combination of vector scanning and raster scanning. Other alternative embodiments may use substantially non-perpendicular main and secondary scanning directions along with techniques that result in proper placement of droplets.

In other alternative embodiments multiple prints heads may be used which lay end to end (extend in the secondary scanning direction) and/or which are stacked back to back (stacked in the main scanning direction). When stacked back to back the printheads may have orifices aligned in the main scanning direction so that they print over the same lines or alternatively they may be offset from one another so as dispense material along different main scanning lines. In particular, it may be desirable to have the back to back printheads offset from each other in the secondary scanning direction by the desired raster line spacing to minimize the number of main scanning passes that must occur. In other alternative embodiments the data defining deposition locations may not be located by pixels defining a rectangular grid but instead may be located by pixels laid out in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

With reference to FIG. 1, planarizer 14 comprises a heated rotating cylinder with a smooth surface. Its function is to melt, transfer and remove portions of the most recently dispensed layer of material, to smooth it out, to set a desired thickness for the last formed layer, and to set the net upper surface of the last formed layer to a desired level (i.e. the desired working surface or working level for forming a next lamina of the object). Numeral 22 identifies a layer of material that has just been deposited by the printhead. The rotating cylinder planarizer 14 is mounted to the dispensing carriage 10 such that it is allowed to project from the underside of the platform by a sufficient amount in the Z-direction such that it contacts material 22 on build platform 20 at a desired level below the orifice plate (the spacing between the planarizer 14 and material 22 is exaggerated in FIG. 1, to more clearly show elements of the system).

The rotation of the planarizer cylinder sweeps material from the just-deposited layer, leaving a smooth surface. The just-deposited material adheres to the smooth, heated surface of the cylinder and is displaced until it contacts a wiper (not shown). The wiper is disposed to effectively "scrape" the material from the surface of the cylinder. This material, which is still flowable, is either disposed of or recycled.

With reference to FIG. 1, build platform 20 defines a surface on which is built the three-dimensional object or part layer-by-layer. This platform 20 is preferably supported for movement and driven back and forth in the Y-direction (i.e., index direction or secondary scanning direction) under computer control by the apparatus 24 of FIG. 1. The build platform 20 also is supported for movement and is driven up and down (typically progressively downward during the build process) in the Z-direction under computer control.

Figure 2:
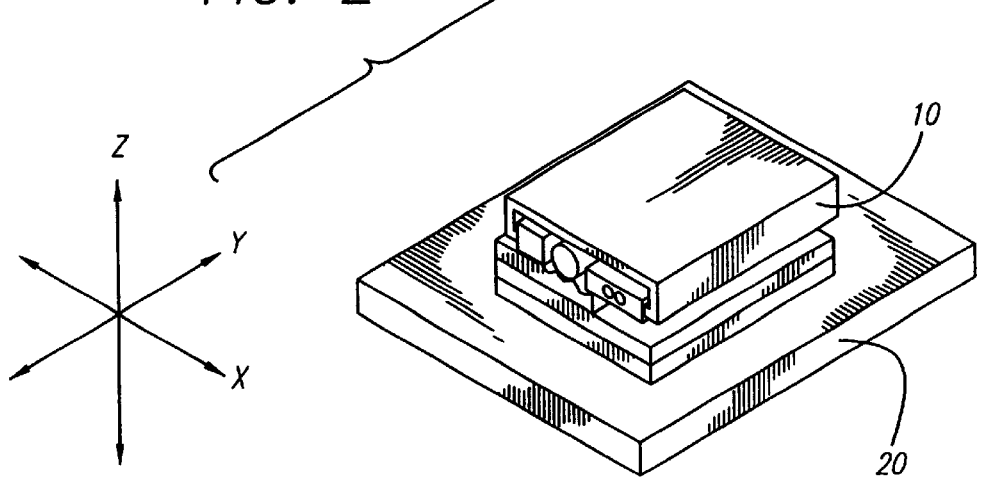
FIG. 2 shows a perspective of the three dimensional printing apparatus of FIG. 1.

FIG. 2 illustrates another view of a build platform 20. A three-dimensional object 22 is being built, layer-by-layer, on the build platform 20. As hot melt is deposited onto the build platform 20, the deposition builds layers of a three-dimensional object. The layers form an object 22 in three-dimensions (X, Y, and Z).

To build a cross-section of a part, the build platform 20 moves in the Z-direction relative to the printhead 12, such that the last-built (i.e., dispensed and possibly planed) layer of the part is situated an appropriate amount below the orifice plate 18 of the printhead 12. The printhead 12 is moved one or more times over the XY build region (the head sweeps back and forth in the X direction, while the Y-stage translates the partially formed object in the Y-direction). The combination of the last formed layer of the object and any supports associated therewith define the working surface for deposition of the next lamina and any supports associated therewith. During translation in the XY directions, the jets of the printhead are fired in a registered manner with previously dispensed layers to deposit material in a desired pattern and sequence for the building of the next lamina of the object. During the dispensing process, a portion of the dispensed material is removed by the planarizer in the manner discussed above. The X, Y and Z movements, dispensing, and planarizing are repeated to build up the object from a plurality of selectively dispensed and adhered layers. In an alternative embodiment the step of planarization could be performed independently of the dispensing steps. In other alternative embodiments the planarizer may not be used on all layers but instead may be used on selected or periodic layers.

As noted previously, in a preferred embodiment, the printhead is directed to trace a raster pattern. The raster pattern consists of a series of raster lines, R(1), R(2), . . . , R(N), running in the X-direction or main scanning direction and arrayed along the Y-direction (i.e. index direction or secondary scanning direction). The raster lines are spaced from one another by a distance $d_r$, which, in a preferred embodiment, is 1/300 inches (about 3.3 mils or about 83.8 $\mu$m).

This is accomplished by following a two-step process. The first step includes alternating main scanning direction passes with secondary scanning direction movements of an amount equal to the desired raster line resolution until all raster lines between initial lines dispensed by two adjacent jets are scanned. Thereafter, a second step includes a large index direction increment is made. The first and second steps are repeated until the indexing direction increments, and lines scanned, are sufficient to deposit material on all raster lines required to form the object layer or cross-section (including any necessary supports for forming subsequent cross-sections).

The firing of the ink jet orifices is controlled by a rectangular bit map maintained in a control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives, other pixel alignment patterns are possible. For example, pixels on adjacent rows may be offset in the main scanning direction by a fractional amount of the spacing between pixels in the main scanning direction so that their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined or object basis pattern.

The data resolution in the main scanning direction may be defined in terms of Main Direction Pixels (MDPs). MDPs may be described in terms of pixel length or in terms of number of pixels per unit length. In a preferred embodiment MDP=300 pixels per inch (3.3 mils/pixel or 677.4 $\mu$m/pixel). In other preferred embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In a preferred embodiment SDP=MDP=300 pixels per inch (3.3 mils/pixel or 677.4 $\mu$m/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways either by dispensing the droplets at intermediate points between the centers of successive pixels (i.e. intermediate dropping, "D") or alternatively directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the printhead and/or object more slowly.

If SDL and/or MDL is less than SDP and/or MDP, respectfully, drops will be fired at fewer locations than those for which data exists, at least for a given pass of the printhead. This data situation may be used to implement the offset pixel and/or non-uniform sized pixel techniques discussed above.

To build a cross-section, the bit map is first loaded with data representative of the desired cross-section (as well as any supports that are desired to be built). Assuming, as with the preferred embodiment, a single build and support material is being used, if it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

FIG. 1 depicts a representative example apparatus and system for processes according to the instant invention. These embodiments use jets that are computer controlled to selectively emit droplets of solidifiable material when each jet isi appropriately located at desired location of a build platform 20.

Figure 3:
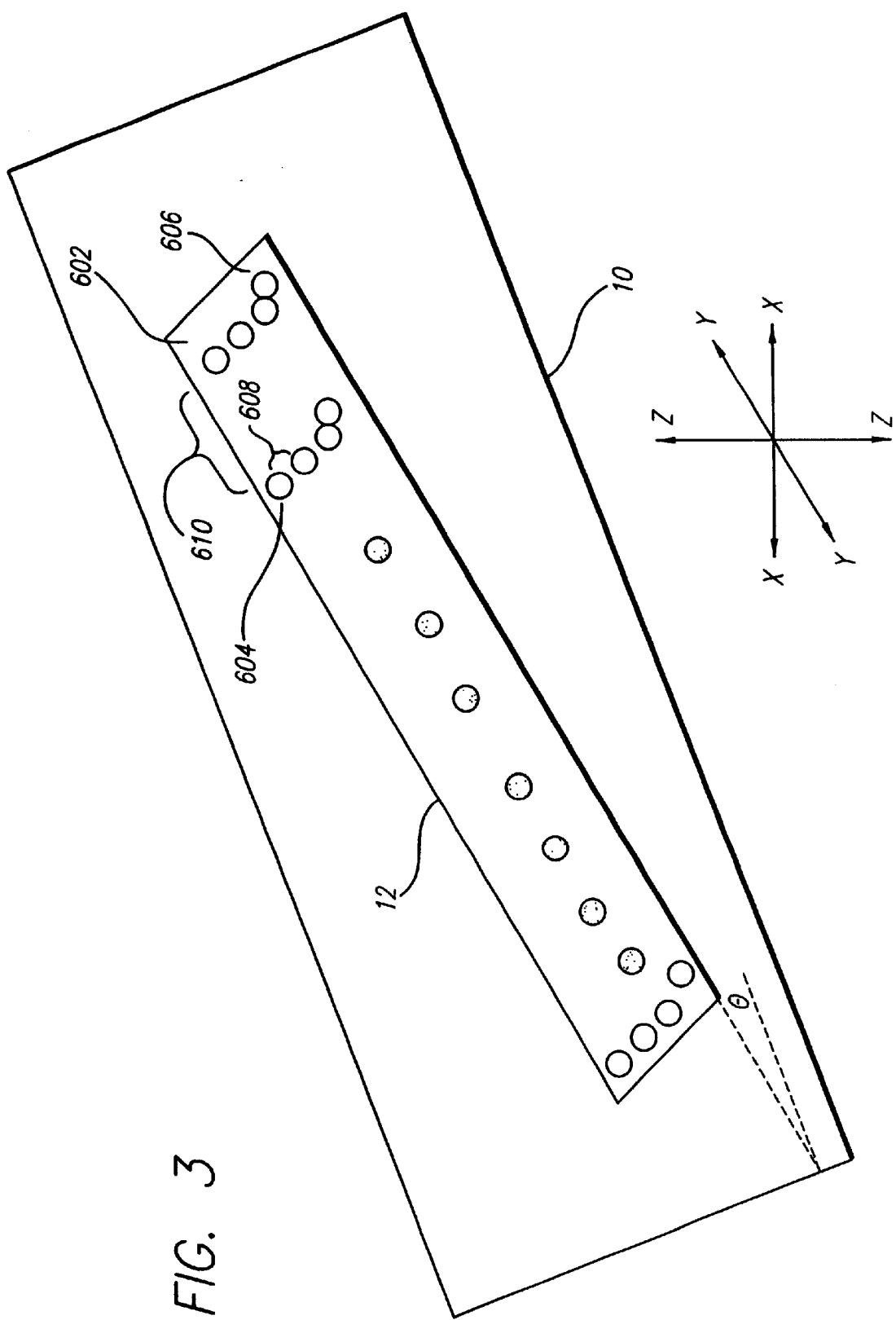
FIG. 3 shows an offset printhead mounted as a part of the dispensing carriage.

As discussed herein, a group of jets is defined as a plurality of jets that are arranged at a closer spacing to each other than to any jet in any adjacent group. FIG. 3 displays exemplary groups of jets. Spacing between Jet group one 602 and Jet group two 604 is exaggerated for simplifying the present disclosure. Jet group one 602 and Jet group two 604 each have four jets 606 that are arranged with close spacing 608. As shown, a larger spacing 610 exists between the jets in jet group one 602 and the jets in jet group two 604.

Figure 4:
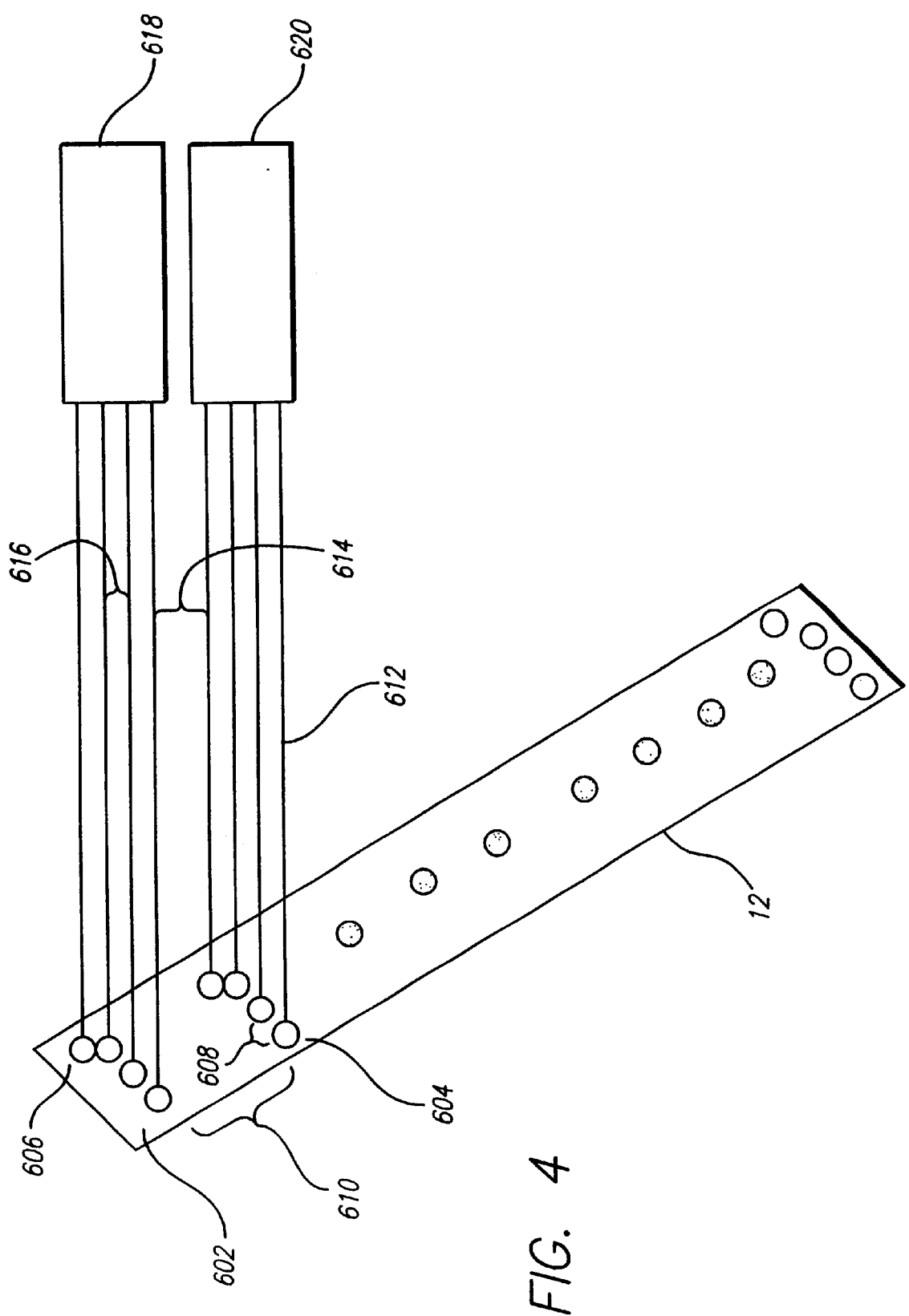
FIG. 4 shows the printhead assembly drawing raster lines.

The spacing between the raster lines 612 (FIG. 4) covered by the jets 606 is related to how the jets 606 are arranged. For example, a large raster line space 614 exists between jets in Jet group one 602 and jets in Jet group two 604. A small raster line space 616 exists for jets in the same group.

In accordance with the present invention, each jet in each group is adjusted until the deposition heights of the droplets in the first region (e.g., numeral 618) and the deposition heights of the droplets in the second region (e.g., numeral 620) are uniform. The deposition height may be uniform within one layer or the deposition height may be uniform amongst all layers. Additionally, the drop volume capability of each jet is controlled until all droplets of material have a uniform volume. In alternative configurations of the third embodiment, the droplets of solidifiable material have volumes that are uniform within 10%; within 5%; and within 2%.

Referring to FIG. 3 it is seen that there are a series of offset printhead ink jets. There are 88 groups of 4 ink jets in the preferred embodiment of the present invention.

The offset ink jets require that the angle of the non-linear printhead having a width and a length with a length-wise axis be in a relationship to the dispensing carriage having a width and a length and having a lengthwise axis such that the length axis of the non-linear printhead and the lengthwise axis of the dispensing carriage do not intersect. Otherwise, it is desired that the lengthwise axis of the non-linear printhead and the lengthwise axis of the dispensing carriage are neither parallel nor coincidental.

As best seen in FIG. 2, the three-dimensional printer has the ink jets in the printhead gravitationally oriented. Stated otherwise, the printhead assembly is oriented such that the ink jets fire the hot-melt ink toward the center of the earth (toward the X-Y plane). This is of course, directly opposite to typical printers that print in the vertical direction (Y, toward the X-Z plane). Thus printing in the present invention is done on the X-Y plane whereas the typical printhead is utilized to print on the X-Z plane.

As best seen in FIG. 3, the printhead assembly for the three-dimensional printer has rows and columns of the jets. In the preferred embodiment of the invention, one or more of the jets in at least one row comprise at least one group of four jets and three of the four jets in the group are linearly aligned and the forth jet is not linearly aligned.

Also as seen in FIG. 3, the printhead assembly for the three-dimensional printer has the printhead rows and printhead columns grouped into four jets with three of the four jets. in the groups linearly aligned and the fourth jet is aligned in a non-linear fasion. The longitudinal axis of the printhead is positioned at an offset angle (ρtheta) to the longitudinal axis of the dispensing carriage of between 8° and 10°. It has been observed that while an angle of 4.5° is preferred for speed in the X-direction, that most of the jets maybe favorably fired to achieve a greater rate of building a three-dimensional object when the offset angle of the forth jet is between 8° and 10°. Preferably, the offset angle of the dispensing carriage 10 and the printhead, with the fourth jet positioned non-linearly from the remaining three jets in a group of four is between 9.3° and 9.6°, most preferably at about 9.43°.

What is claimed is:

1. A printhead assembly for a three-dimensional printer comprising:
   a non-linear printhead having a width and a length and a plurality of jets in a multi-jet grouping, said non-linear printhead length having a lengthwise axis, a dispensing carriage having a width and a length, said dispensing carriage length having a lengthwise axis, said printhead having at least one of its jets in the multi-jet grouping positioned off line in a non-linear fashion and being connected with said dispensing carriage such that the lengthwise axis of said non-linear printhead and the lengthwise axis of said dispensing carriage intersect when positioned in the same plane, and the printhead containing rows and columns of jets and the jets in at least one row comprising at least one group of four jets, three of the four jets in the group being linearly aligned and the fourth jet in the group not being linearly aligned, the fourth jet having an offset angle of between eight and ten degrees.

2. The printhead assembly for a three-dimensional printer according to claim 1, wherein one or more of the jets in the printhead assembly are gravitationally oriented to print in an X-Y plane.

3. A printhead assembly for a three-dimensional printer comprising:

a printhead having a width and a length and a plurality of jets in a multi-jet grouping, said printhead length having a lengthwise axis, a dispensing carriage having a width and a length, said dispensing carriage length having a lengthwise axis, said printhead having at least one of its jets in the multi-jet grouping positioned off line in a non-linear fashion and being connected with said dispensing carriage and provided further that the lengthwise axis of said printhead and the lengthwise axis of said dispensing carriage are not parallel and are not coincidental, and the printhead containing rows and columns of jets and the jets in at least one row comprising at least one group of four jets, three of the four jets in the group being linearly aligned and the fourth jet in the group not being linearly aligned.

4. The printhead assembly for a three-dimensional printer according to claim 3, wherein one or more of the jets in the printhead assembly are gravitationally oriented to print in an X-Y plane.

5. A method of three-dimensional printing to obtain a three-dimensional object including utilizing a printhead assembly comprising:

moving a dispensing carriage having a width and a length along a path of travel, the dispensing carriage length having a lengthwise axis, mounting a printhead to the dispensing carriage, the printhead having at least one of its jets in a multi-jet grouping positioned off line in a non-linear fashion and being connected with said dispensing carriage such that the lengthwise axis of said printhead and the lengthwise axis of said dispensing carriage intersect when positioned in the same plane, the printhead further containing rows and columns of jets and the jets in at least one row comprise at least one group of four jets, three of the four jets in the group being linearly aligned and the fourth jet in the group not being linearly aligned, gravitationally orienting the printhead to print in an X-Y plane, and jetting a material from the printhead on successive occasions to obtain a three-dimensional object.

6. A method of three-dimensional printing to obtain a three-dimensional object including utilizing a printhead assembly comprising:

moving a dispensing carriage having a width and a length along a path of travel, the dispensing carriage length having a lengthwise axis, mounting a printhead to the dispensing carriage, the printhead having at least one of its jets in a multi-jet grouping positioned off line in a non-linear fashion and being connected with said dispensing carriage such that the lengthwise axis of said printhead and the lengthwise axis of said dispensing carriage are not parallel and are not coincidental, the printhead further containing rows and columns of jets and the jets in at least one row comprise at least one group of four jets, three of the four jets in the group being linearly aligned and the fourth jet in the group not being linearly aligned, and jetting a material from the printhead on successive occasions to obtain a three-dimensional object.

7. The method of three-dimensional printing according to claim 6, wherein the printhead is gravitationally oriented to print in an X-Y plane.

8. A method of three-dimensional printing comprising employing an offset printhead and a moveable printing platform wherein the offset printhead, when in operation, moves in the direction of an X-axis (Y-Z plane) and the moveable printing platform moves, when in operation, in the direction of a Y-axis (X-Z plane); and printing with the printhead so the printhead deploys a greater number of droplets per inch in the direction of the X-axis and a lesser number of droplets per inch in the direction of the Y-axis wherein the ratio of droplets per inch in the direction of the X-axis to the number of droplets per inch in the direction of the Y-axis is about 1.05 to about 1.40.

9. The method of three-dimensional printing according to claim 8, wherein the ratio of droplets per inch in the direction of the X-axis to the number of droplets per inch in the direction of the Y-axis is about 1.1 to about 1.35.

* * * * *

UNITED STATES PATENT AND TRADEMARK OFFICE
CERTIFICATE OF CORRECTION

PATENT NO. : 6,357,855 B1 Page 1 of 1
DATED : March 19, 2002
INVENTOR(S) : Thomas A. Kerekes et al.

It is certified that error appears in the above-identified patent and that said Letters Patent is hereby corrected as shown below:

Column 7,
Lines 17-18, should read -- (i.e. intermediate dropping, "ID") --
Line 57, should read -- jet is appropriately --

Column 8,
Line 51, should read -- angle (σ theta) to the --

Signed and Sealed this

Ninth Day of December, 2003

JAMES E. ROGAN
*Director of the United States Patent and Trademark Office*